United States Patent [19]

Vanhauwaert

[11] Patent Number: 4,676,629
[45] Date of Patent: Jun. 30, 1987

[54] METHOD AND APPARATUS FOR THE MANIFOLD STEPWISE REPRODUCING OF ONE AND THE SAME TRANSPARENT IMAGE

[76] Inventor: Luk Vanhauwaert, Van Schoonbekestraat 35, 2000 Antwerpen, Belgium

[21] Appl. No.: 787,521

[22] Filed: Oct. 15, 1985

[30] Foreign Application Priority Data

Oct. 24, 1984 [BE] Belgium .............................. 213883

[51] Int. Cl.⁴ .............................................. G03B 27/42
[52] U.S. Cl. .......................................... 355/53; 355/67
[58] Field of Search .................................. 355/67–70, 355/53, 54

[56] References Cited

U.S. PATENT DOCUMENTS

| 2,153,186 | 4/1939 | Henderson | 355/70 |
| 2,487,066 | 11/1949 | Moen, Jr. | 355/67 |
| 3,026,767 | 3/1962 | Smith, Jr. | 355/54 |
| 3,639,059 | 2/1972 | Strumor et al. | 355/53 X |
| 3,854,815 | 12/1974 | McIntosh | 355/67 |
| 4,329,045 | 5/1982 | Rees et al. | 355/54 X |

Primary Examiner—Richard A. Wintercorn
Attorney, Agent, or Firm—Lyon & Lyon

[57] ABSTRACT

A method and apparatus for stepwise reproducing a transparent image repetitively onto photosensitive material such as a film, photo printing paper or offset plate, employing a so-called vertical or auto-vertical reproduction camera with a film holder and a model board with a lens between them. A flash light source repetitively projects images onto the light-sensitive material fixedly drawn over the film holder while the image or image component is stepwise moved over the model board along X and Y axes. The lens, film holder and model board positions are fixed, and any change in the reproduction camera remains superfluous since shutter operation is dispensed with and, thus, multiple substantially sharp images are obtained on the photographic material.

4 Claims, 3 Drawing Figures

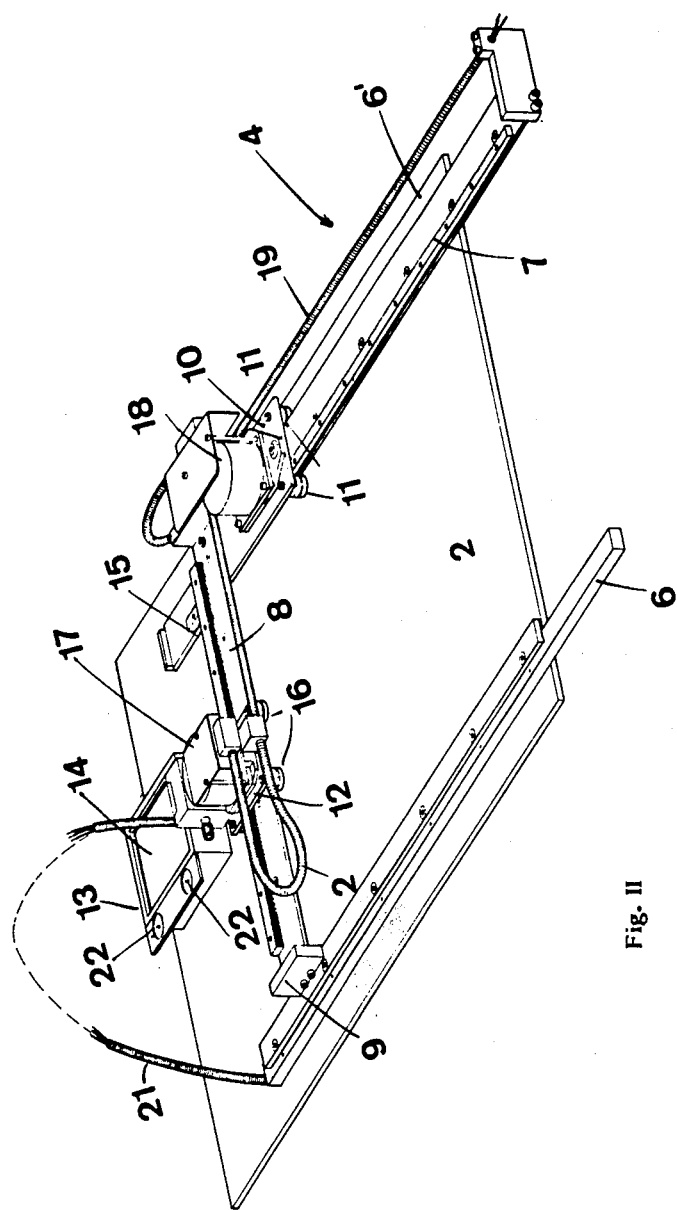
Fig. II

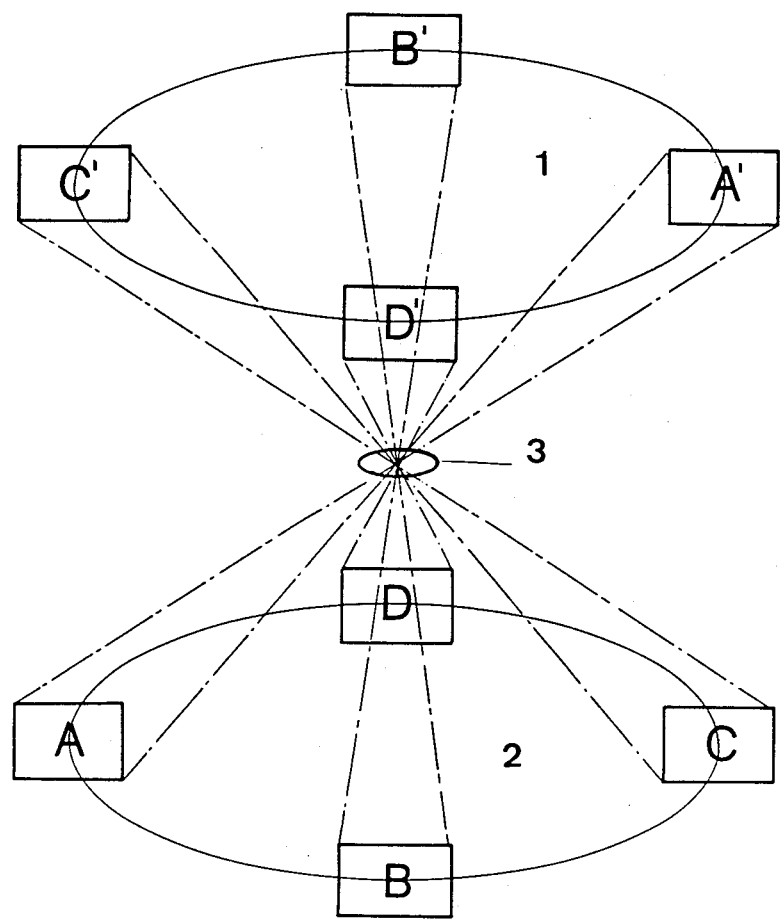
Fig. III

METHOD AND APPARATUS FOR THE MANIFOLD STEPWISE REPRODUCING OF ONE AND THE SAME TRANSPARENT IMAGE

This invention relates to a method for the manifold stepwise reproducing of one and the same transparent image or image component on photo-sensitive material, such as notably a film, photo printing paper or an offset plate.

The object of the invention is to provide a method and an apparatus to be used thereby, whereby it becomes possible to use without any change a vertical or auto-vertical reproduction camera for the manifold reproducing of one and the same transparent image or image component on photo-sensitive material, in such a way that the reproduction camera being used still retains the original function thereof and this in spite of the temporary adaptation for said method.

The problem this Application provides a remarkable solution to, has been approached in U.S. Pat. No. 3,026,767.

The copy holder according to said Patent is built under the assumption that images may be projected on a light-sensitive plate, wherefor a permanent light source projects said image while a shutter has to be operated every time between two projections.

The camera operator has thus to control said shutter every time between two projections, or bring substantial changes to the camera to control the shutter by means of a computer-controlled unit, for example. The device according to said Patent is not suitable to be used with a reproduction camera of vertical or auto-vertical type, without adapting same to this requirement.

An essential object of this invention is to provide a method and an apparatus whereby a camera of the above-defined type, whatever the standard, size or features thereof may be, and without any converting thereof, may be used to reproduce *step by step*, an image on a photo-sensitive material.

To obtain this according to the invention, use is made of a so-called vertical or auto-vertical reproduction camera with a film holder and a model board, and a lens arranged therebetween, and said transparent image or image component is projected by making use of a flash light source through said reproduction camera lens onto a light-sensitive material fixedly drawn on the so-called film holder, whereby means are provided to move the image or image component stepwise along the X- and Y-axis over the model board.

The invention further pertains to the apparatus being used to work the method according to the invention.

Other details and advantages of the invention will stand out from the following description, given by way of non limitative example and with reference to the accompanying drawings, in which:

FIG. 2 is a perspective showing on a larger scale of the apparatus to be used with the method.

FIG. 3 is a diagrammatic showing of the image projection from the optic axis but within the image circle, as this occurs with a vertical reproduction camera.

Figure 1:
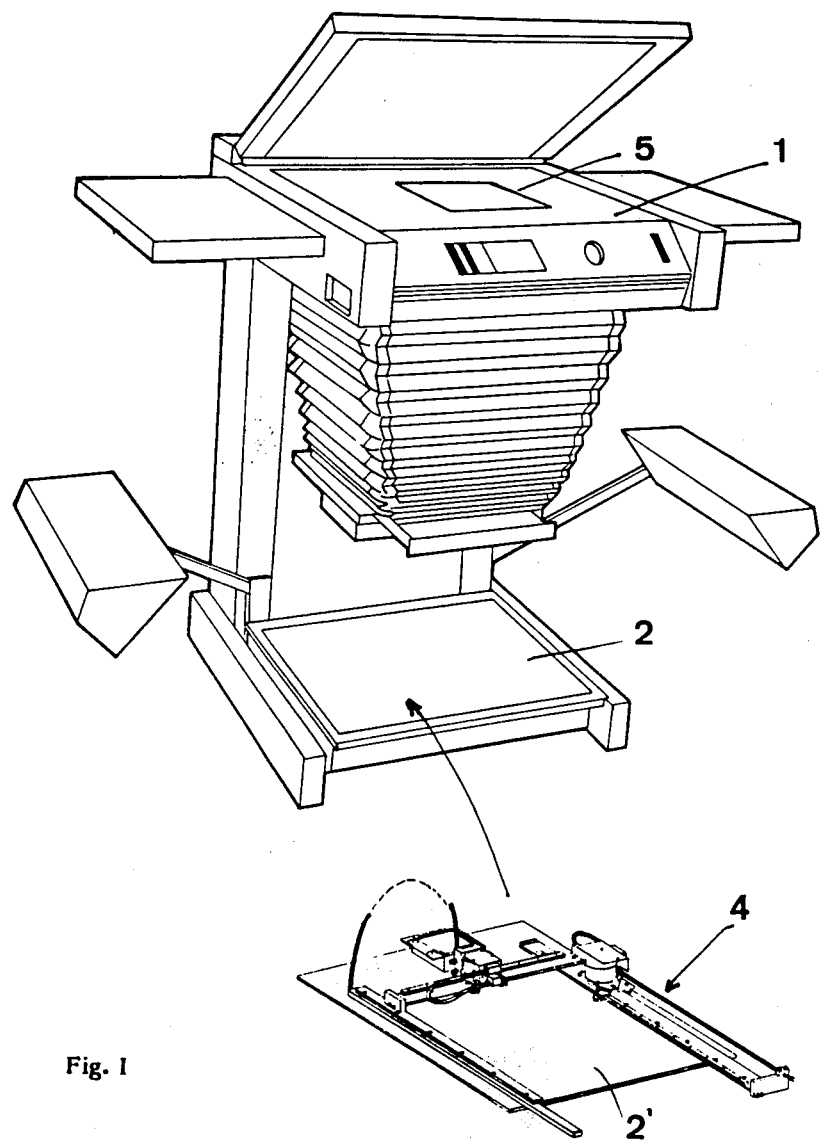
FIG. 1 is a perspective showing of a vertical reproduction camera, with the apparatus to be used therewith.

A conventional reproduction camera as shown in FIG. 1, comprises a film holder 1 and a model board 2.

A lens 3 (FIG. 3) is provided at an adjustable height between both said components.

Such a vertical reproduction camera may now without changing the specific function thereof, by applying the original method and the apparatus to be used therewith according to the invention, be adapted for a temporary function, namely the manifold reproduction onto photo-sensitive material, of a transparent image or image component.

Such temporary or permanent adaptation of such a conventional reproduction camera for said manifold reproduction forms the core of this invention. Before describing the method and the apparatus to be used therewith, it will be made clear what should be understood by stepwise manifold reproduction of an image or image component.

The image to be reproduced lies as transparent image or image component and should thus be transferred repeatedly onto photo-sensitive material. Photo-sensitive materials are notably films, various photo printing papers or offset plates. Said materials are given by way of example, as numerous photographic materials may be used. When an image component is being meant, then there is notably meant the decomposing of a colour image into various printing blocks, the so-called photomechanical, mechanical and hand colour selections.

According to the invention, use is made without any change, of a reproduction camera of the vertical or auto-vertical type. On the model board 2, the apparatus 4 is arranged, while the photo-sensitive material 5 is arranged on the film holder 1. The photo-sensitive material is unmovable and it is covered against light in the usual way on the top side. The making fast relative to film holder 1 of said photo-sensitive material 5 may occur in the most varied ways, generally by suction.

The apparatus 4 is adjusted on the model board 2. Said apparatus is retained in the final location thereof by the own weight thereof. It may also be secured on a plate 2' which replaces the model board 2. The apparatus is essentially formed by two small parallel runners 6 and 6'. On the one thereof, for example runner 6', a rack 7 is secured. Between said small runners 6 and 6', a bridge 8 is movably arranged. Said bridge 8 is moved on the one side along runner 6, by means of a guide block 9, and on the other side along runner 6'. For this purpose there is secured on the bridge 8, a small carriage 10 which is provided with small wheels 11 which grip on the edge of small runner 6'.

On said bridge 8 there is further provided an alternately-movable carriage 12 whereon a box 13 is secured. The small carriage 12 is fitted with small wheels 16 which grip about the lengthwise edges of bridge 8. Inside the box 13, a flash light source is built-in and moreover there is provided a vacuum system for retaining in position the image or image component as well as register pins 22 for positioning the image or image component.

By the wording "flash light source", there is meant here a light source which generates an ultra-short light flash, such as a sintered-electrode light source.

A window 14 in box 13 then has also a size which corresponds to the size of the image to be reproduced or the non-transparent framing thereof.

On the bridge 8 as well as on the small runner 6', a rack is secured. The rack 15 on bridge 8 is then also provided for moving cross-wise the small carriage 12, while rack 7 insures the stepwise lengthwise displacement of the small carriage 10.

Both small carriages 10 and 12 are provided with motors 17 and 18, which insure the stepwise displacement relative to said racks 15 and 7. The electric lines which are required for the alternating movement of small carriages 10 and 12, are supported inside flexible sleeves 19 and 20, while the electric conductors for the synchronized firing of the flash light source built inside box 13 run inside similar flexible sleeves 21.

Now to reproduce onto the photo-sensitive material 5, along the lengthwise axis and along the cross-wise axis thereof, a number of identical images from the transparent image which is held by box 13, it is only necessary for each new position of said box 13, to operate the flash light source built inside said box. The ray beam formed thereby is received by lens 3 (FIG. 3) and transfered in a reversed sequence to said photo-sensitive material 5.

It has now been ascertained in a surprising way that there appears every time on the photo-sensitive material 5, a sharp and fog-free image, in such a way that the photo-sensitive material 5 unmovable relative to film holder 1, does receive for each new position of the transparent image and thus of box 13, a reproduction of said image. The sequence wherein the images appear on the photo-sensitive material may be called diametrically opposite relative to the position of box 13, and thus of the transparent image relative to model board 2.

Tests have shown that this may be realized with a shutter that remains open. This is clearly due to the use of the ultra-short exposures with the use of a flash light source, whereby the possible stray light remains below a well-determined limit value, in such a way that sharp repeated images appear. No fog is to be noticed in and between the images.

It is thus essential to use a microsecond short exposure time obtained with a sintered-electrode light source for instance. Even with sensitive halftone film, more than 200 fog-free images may be reproduced due to the method being used.

There thus results therefrom that without having to change or adapt any component from the reproduction camera, except for the use of ultra-short exposures, the method according to the invention and the apparatus 4 used therewith make it possible to project through camera lens 3 an image in such a way onto the sensitized material 5, that said image takes a location both in the lengthwise and in the cross-wise direction which conversely corresponds to the position taken relative to model board 2, by box 13 with the image to be reproduced.

FIG. 3 is a diagrammatic showing of the phenomenon. In this figure, the letters A, B, C and D show four possible locations of box 13 relative to model board 2. Said model board is shown with reference numeral 2 in the lowermost imaging oval. Each one of said images A, B, C, D is projected through lens 3 onto film holder 1 which is shown with this reference by the uppermost ellipse-shaped path 1 in FIG. 3. The images A, B, C and D then also result in images A', B', C', D'.

FIG. 3 shows how the image component moves within the optic image circle. This shows that the transparent image or image component does not have to stay in the optic axis. Lens and film holder remain unmovable. On the basis of this demonstration, there has been developed the principle whereby the reproduction camera remains structurally unchanged.

It must be understood that the invention is in no way limited to the above embodiments and that many changes may be brought thereto without departing from the scope of the invention as defined by the appended claims.

I claim:

1. Method for the manifold stepwise reproducing of one and the same transparent image or image component repetitively onto photo-sensitive material, such as notably a film, photo printing paper or an offset plate, which comprises making use of a so-called vertical or auto-vertical reproduction camera with a film holder and a model board, and a lens arranged there-between, and repetitively projecting said image or image component, by making use of a flash light source, through said lens of said reproduction camera onto said light-sensitive material fixedly drawn over said film holder, whereby means are provided to move the image or image component stepwise along the X- and Y-axis over the model board, and repetitively exposing the transparent image or image component to the photosensitive material at different points along the X- and Y-axis in such a way that said lens, film holder and model board remain thereby unmoving, and any change in the reproduction camera remains superfluous, particularly any intervention on a shutter is dispensed with, and multiple substantially sharp images are obtained on the photosensitive material.

2. Method as defined in claim 1, which further comprises making use as a flash light source, of a sintered-electrode light source which generates an ultra-short light flash.

3. Apparatus for the working of the method as defined in either one of claim 1 and 2, which is essentially comprises of two small parallel runners wherebetween a bridge may be moved stepwise, wherefor both on said bridge and on one said small runners, a rack is secured, and relative to said last small runner with rack, as well as relative to the bridge with rack, a small carriage may be displaced stepwise along the X- and Y-axis, and the second carriage bears a box with built-in flash light source, whereon the transparent image may be fastened.

4. Apparatus as defined in claim 3, in which said flash light source is comprised of a sintered-electrode light source which generates an ultra-short light flash.

* * * * *